United States Patent
Nugent et al.

(10) Patent No.: US 9,473,841 B2
(45) Date of Patent: Oct. 18, 2016

(54) ACOUSTIC SOURCE SEPARATION

(71) Applicant: University of Surrey, Guildford (GB)

(72) Inventors: David Nugent, Cambridgeshire (GB); Banu Gunel, Ankara (TR)

(73) Assignee: University of Surrey, Guildford (GB)

( * ) Notice: Subject to any disclaimer, the term of this patent is extended or adjusted under 35 U.S.C. 154(b) by 18 days.

(21) Appl. No.: 14/388,280

(22) PCT Filed: Mar. 26, 2013

(86) PCT No.: PCT/GB2013/050784
§ 371 (c)(1),
(2) Date: Sep. 26, 2014

(87) PCT Pub. No.: WO2013/144609
PCT Pub. Date: Oct. 3, 2013

(65) Prior Publication Data
US 2015/0055796 A1    Feb. 26, 2015

(30) Foreign Application Priority Data

Dec. 20, 2012  (GB) .................................. 1223091.8
Mar. 26, 2013  (GB) .................................. 1205289.0
Mar. 26, 2013  (WO) ............... PCT/GB2013/050784

(51) Int. Cl.
| | |
|---|---|
| H04R 3/00 | (2006.01) |
| H04R 1/08 | (2006.01) |
| H04R 1/40 | (2006.01) |
| H04R 25/00 | (2006.01) |
| H04R 1/04 | (2006.01) |

(52) U.S. Cl.
CPC .............. H04R 1/08 (2013.01); H04R 1/406 (2013.01); H04R 3/005 (2013.01); *H04R 1/04* (2013.01);
(Continued)

(58) Field of Classification Search
CPC .............. H04R 3/005; H04R 2499/11; H04R 2420/07; H04R 5/027; H04R 17/02; H04R 1/08; H04R 29/004; H04R 11/04; H04R 1/342; H04R 9/08; H04R 2201/403; H04R 23/00; H04R 19/04; H04R 1/04; H04R 1/38; H04R 1/406; H04R 2201/003; H04R 2201/401; H04R 2201/405; H04R 2307/025; H04R 2430/00; H04R 2430/20; H04R 25/405
USPC ........... 381/92, 58, 309, 326, 355, 369, 370, 381/56, 59, 96, 162, 171, 174
See application file for complete search history.

(56) References Cited

U.S. PATENT DOCUMENTS

| | | |
|---|---|---|
| 7,058,184 B1 | 6/2006 | Hickling |
| 2002/0181721 A1 | 12/2002 | Sugiyama et al. |

(Continued)

FOREIGN PATENT DOCUMENTS

| | | |
|---|---|---|
| WO | 2007025033 A2 | 3/2007 |
| WO | 2009050487 A1 | 4/2009 |

(Continued)

OTHER PUBLICATIONS

Benjamin, Eric et al., "The Native B-Format Microphone: Part 1", Oct. 7-10, 2005, pp. 1-15, Audio Engineering Society Convention Paper 6621.

(Continued)

*Primary Examiner* — Akelaw Teshale
(74) *Attorney, Agent, or Firm* — Wegman, Hessler & Vanderburg

(57) ABSTRACT

A system for directionally selective sound reception comprises an array of pressure sensors each arranged to output a pressure signal indicative of pressure, and processing means arranged to receive the pressure signals, identify a plurality of frequency components of the signals, identify at least one source direction, and identify at least one of the components as coming from the source direction. The sensor array comprises support means having two opposite sides and four sensors, at least one of the sensors being supported on each of the sides of the support means.

20 Claims, 5 Drawing Sheets

(52) U.S. Cl.
CPC ....... *H04R 25/405* (2013.01); *H04R 2201/401* (2013.01); *H04R 2201/405* (2013.01); *H04R 2430/00* (2013.01); *H04R 2430/20* (2013.01)

(56) References Cited

U.S. PATENT DOCUMENTS

| | | |
|---|---|---|
| 2004/0120540 A1 | 6/2004 | Mullenborn et al. |
| 2006/0291679 A1 | 12/2006 | Burns |
| 2011/0015924 A1* | 1/2011 | Gunel Hacihabiboglu ... G10L 21/0272 704/231 |
| 2011/0123058 A1 | 5/2011 | Gelinck et al. |
| 2011/0200205 A1 | 8/2011 | Tokuda |
| 2012/0051548 A1* | 3/2012 | Visser ................ G10L 21/0208 381/56 |
| 2016/0080867 A1* | 3/2016 | Nugent ................ H04R 1/026 381/26 |

FOREIGN PATENT DOCUMENTS

| | | |
|---|---|---|
| WO | 2011067292 A1 | 6/2011 |
| WO | 2011103488 A1 | 8/2011 |
| WO | 2012018641 A2 | 2/2012 |
| WO | 2012018641 A3 | 2/2012 |

OTHER PUBLICATIONS

Great Britain Search Report, Application No. GB1205289.0, May 16, 2012.
International Search Report, PCT/GB2013/050784, Mar. 26, 2013, pp. 1-4.
International Preliminary Report on Patentability, PCT/GB2013/050784, Mar. 26, 2013, pp. 1-6.

* cited by examiner

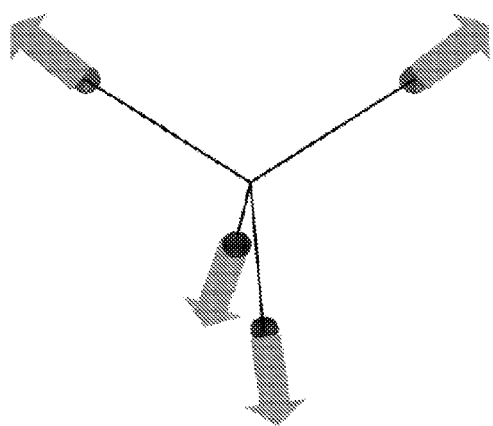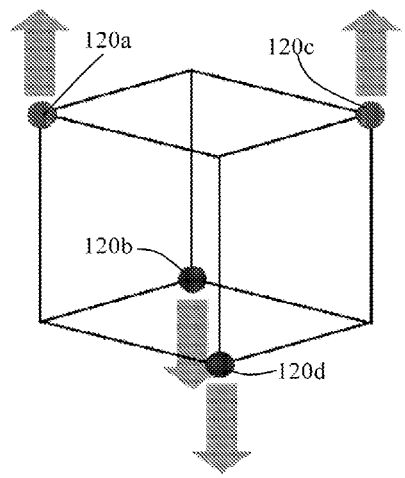
Fig. 3          Fig. 4
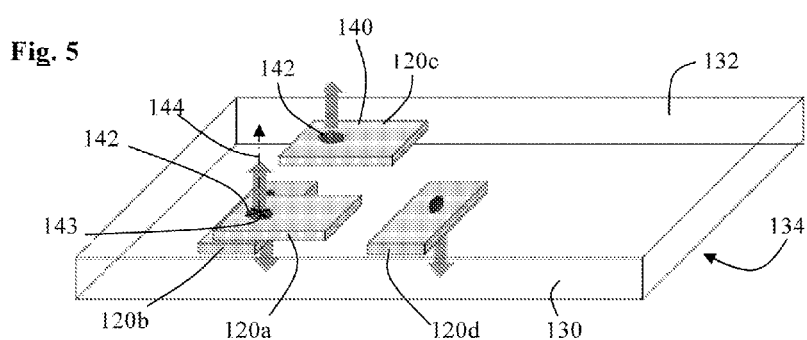
Fig. 5

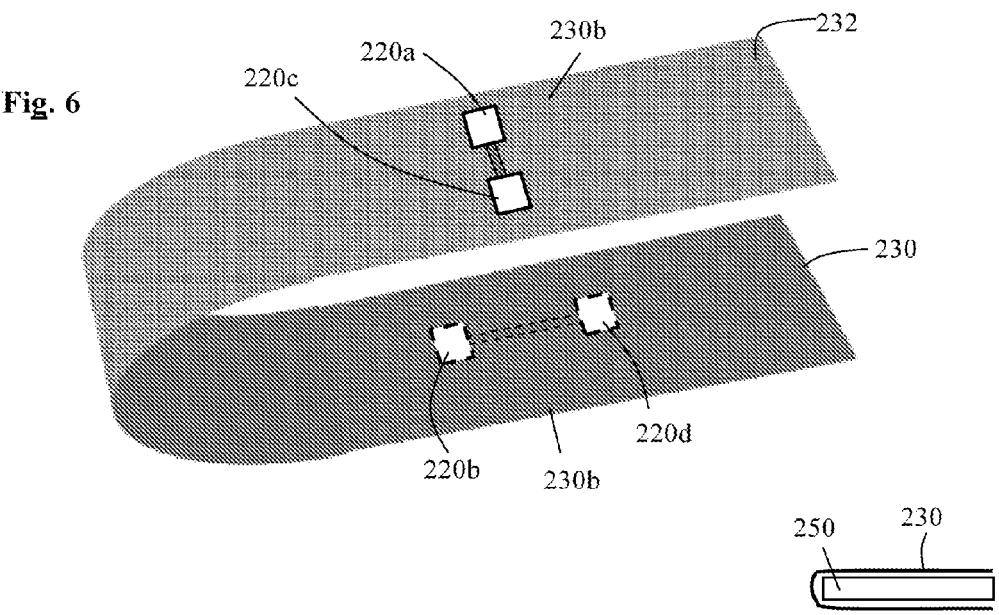
Fig. 6
Fig. 6a
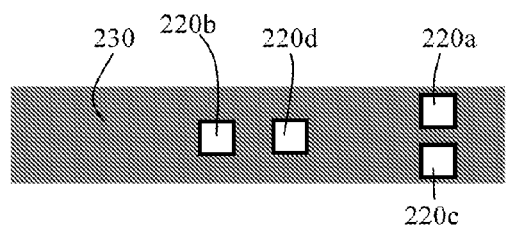
Fig. 7
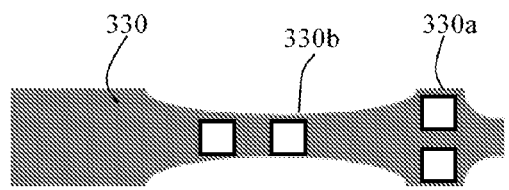
Fig. 8
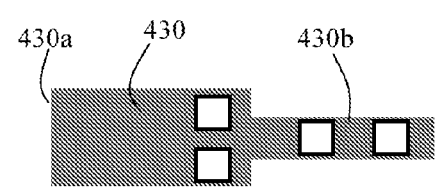
Fig. 9

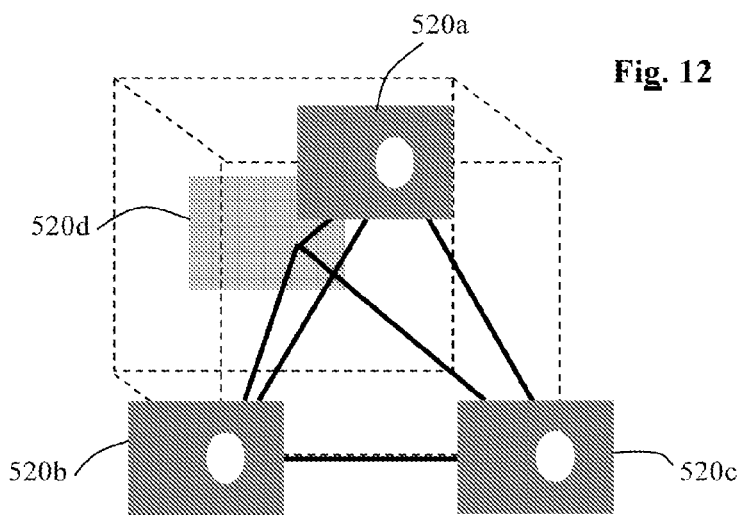
Fig. 12
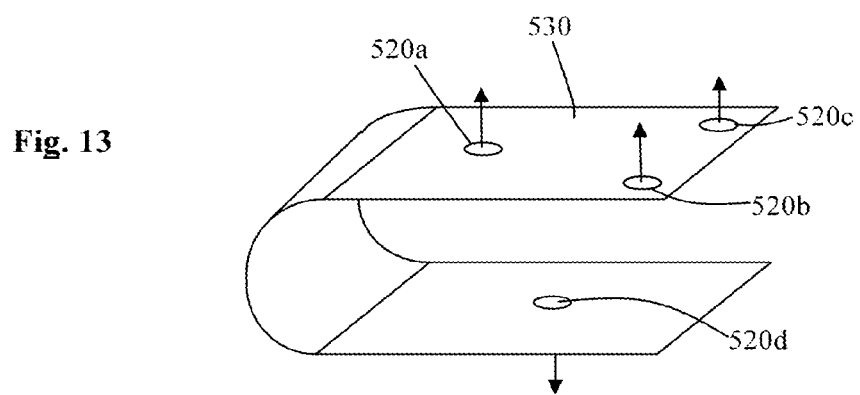
Fig. 13
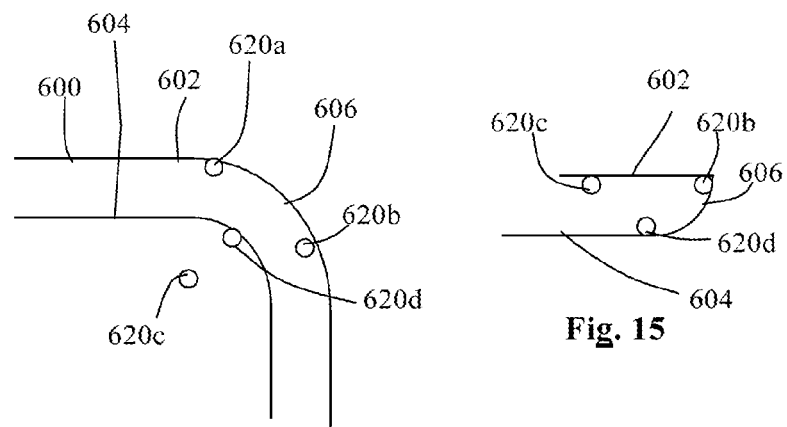
Fig. 14
Fig. 15

ACOUSTIC SOURCE SEPARATION

CROSS-REFERENCE TO RELATED APPLICATIONS

This application claims the priority filing benefit of International PCT Application PCT/GB2013/050784 filed Mar. 26, 2013 and published under PCT 21(2) in the English language, Great Britain Patent Application Serial No. 1205289.0 filed Mar. 26, 2012 and Great Britain Patent Application Serial No. 1223091.8 filed Dec. 20, 2012. All of the above listed applications are herein incorporated by reference.

FIELD OF THE INVENTION

The present invention relates to systems for the separation of a mixture of sounds from different sound sources, and in particular to the design of microphone arrays in such systems.

BACKGROUND TO THE INVENTION

The separation of convolutive mixtures aims to estimate the individual sound signals in the presence of other such signals in reverberant environments. As sound mixtures are almost always convolutive in enclosures, their separation is a useful pre-processing stage for speech recognition and speaker identification problems. Other direct application areas also exist such as in hearing aids, teleconferencing, multichannel audio and acoustical surveillance.

Our earlier patent application published as WO 2009/050487 discloses a system for separating a mixture of acoustic signals from a plurality of sources which comprises a sensor array comprising a plurality of pressure sensors and a processor arranged to receive signals from the sensors, and derive from them a series of sample values of directional pressure gradient, identify a plurality of frequency components of the signals, and define an associated direction for each frequency component. The system is then arranged to identify a subset of the frequency components with a source, thereby to define an acoustic signal for that source. Signals for several sources can be defined. In order to provide three dimensional source separation, a three dimensional array of sensors can be used, for example a tetrahedral array.

Tetrahedral ambisonic surround sound microphones (herein referred to as "tetramics") conventionally comprise four capsule microphones arranged according to a regular tetrahedron. These are well known, and the natural choice for a system such as that of WO 2009/050487. Typically each microphone is a cardioid or sub-cardioid, whose diaphragm is centred at the corner of a regular tetrahedron, and whose direction as defined by the axis of the diaphragm points outwards from the central of the tetrahedron. Typically the four microphones are held in place using customised mechanical assemblages and fixings.

Whilst well suited to high-fidelity ambisonic applications, tetramics are not well suited to many consumer applications. First, they cannot easily be manufactured using the production techniques employed by the consumer electronics industry such as rigid or semi-rigid printed circuit boards. Second, they require manual assembly and hence are more expensive to manufacture compared to an equivalent device produced using automated processes. Third, typically the volume of the tetramic is large compared to the volume of the four component microphones.

These and other matters have limited the application of tetramics to high-fidelity professional audio recording applications. Specifically, tetramics are not generally amenable to being embedded into compact consumer devices such as mobile phones, laptop computers, hearing aids, or into low-cost consumer devices such as lanyard microphones.

SUMMARY TO THE INVENTION

Accordingly the present invention provides a system for directionally selective sound reception comprising an array of pressure sensors each arranged to output a pressure signal indicative of pressure, and processing means arranged to receive the pressure signals. The processing means may be arranged to identify a plurality of frequency components of the signals, identify at least one source direction, and identify at least one of the components as coming from the source direction. The sensor array may comprise support means having two opposite sides and four sensors. At least one of the sensors may be supported on each side of the support means.

Two of the sensors may be supported on one of the sides and two of the sensors may be supported on the other of the sides. Alternatively one of the sensors may be supported on one of the sides and three of the sensors may be supported on the other of the sides.

The system may be arranged to separate a mixture of acoustic signals from a plurality of sources, or it may be a directional listening system arranged to receive sounds only from one or more selected directions.

The support means may have two surfaces, which are parallel to each other, and each of said surfaces may have two of the sensors mounted on it. The support means may comprise a support member, which may be flat, and may comprise sheet. The support means may have the two surfaces on opposite sides thereof. Alternatively the support means may comprise two support portions which are parallel to each other. Each of the support portions may have an outer surface which faces away from the other of the support portions. The outer surfaces may form the surfaces on which the sensors are mounted. The support portions may be connected to each other. For example they may form part of a single common sheet member which is shaped such that the support portions are parallel to each other. Alternatively the support portions may be mounted in a fixed position relative to each other by some other means.

Each of the sensors may have a sensing centre point. This may be the point at which the sensor nominally measures the pressure. It may be the centre of a region over which the sensor is arranged to sense pressure. For example it may be the centre of a diaphragm of the sensor. The sensing centre points of the four sensors may be arranged such that each of them is equidistant from each of the other three. The sensing centre points may be arranged so that they lie at the corners of a regular tetrahedron.

Each of the sensors may have a central axis. The central axis may be an axis about which the sensor has at least a degree of rotational symmetry. The central axis may be a line through the centre of the sensor, and may extend in a direction in which the sensor faces. The sensor may have a rear side which is closest to the support means and a front side, opposite the rear side, which faces in said direction. The two, or three, sensors on one side of the support means may be parallel to each other. For example their central axes may be parallel to each other, or they may face in the same direction. Where there are two sensors on each of the surfaces, the two sensors on the other side of the support means may also be parallel to each other.

The processing means may be arranged to define a series of time windows; and for each time window:

a) generate from the pressure signals a series of sample values of measured directional pressure gradient;

b) identify different frequency components of the pressure signals;

c) for each frequency component define an associated direction;

d) from the frequency components and their associated directions generate a separated signal for one of the sources.

The processing means may be arrange to define from the pressure signals a series of values of a pressure function. A directionality function may be applied to the pressure function to generate the separated signal for the source. For example, the pressure function may be, or be derived from, one or more of the pressure signals, which may be generated from one or more omnidirectional pressure sensors, or the pressure function may be, or be derived from, one or more pressure gradients.

The separated signal may be an electrical signal. The separated signal may define an associated acoustic signal. The separated signal may be used to generate a corresponding acoustic signal.

The associated direction may be determined from the pressure gradient sample values.

The directions of the frequency components may be combined to form a probability distribution from which the directionality function is obtained.

The directionality function may be obtained by modelling the probability distribution so as to include a set of source components each comprising a probability distribution from a single source.

The probability distribution may be modelled so as to include a uniform density component.

The source components may be estimated numerically from the measured intensity vector direction distribution.

Each of the source components may have a beamwidth and a direction, each of which may be selected from a set of discrete possible values.

The directionality function may define a weighting factor which varies as a function of direction, and which is applied to each frequency component of the omnidirectional pressure signal depending on the direction associated with that frequency.

The present invention further provides a device having a front face and a rear face and including a system according to the invention. Each of the sides of the support means may be arranged parallel to one of the faces.

One of the front face and the rear face may be formed of two components, such as a screen and a bezel. A hole may be formed at the boundary between the two components to allow sound from outside the device to reach one of the microphones.

The system may further comprise, in any combination any one or more features of the preferred embodiments of the invention which will now be described by way of example only with reference to the accompanying drawings.

BRIEF DESCRIPTION OF THE DRAWINGS

FIG. 3 is a schematic diagram of the orientation of microphones in a known microphone array;

FIG. 4 is a schematic diagram of the orientation of the microphones in the array of FIG. 2;

FIG. 5 is a diagram of a microphone array forming part of a system according to a second embodiment of the invention;

FIG. 6 is a diagram of a microphone array forming part of a system according to a third embodiment of the invention;

FIG. 6a is a schematic view of the array of FIG. 6 on a support;

FIG. 7 is a diagram of the microphone array of FIG. 7 prior to folding;

FIG. 8 is a diagram of a microphone array according to a fourth embodiment of the invention prior to folding;

FIG. 9 is a diagram of a microphone array according to a fifth embodiment of the invention prior to folding;

FIG. 12 is a schematic diagram of the orientations of a microphone array forming part of a system of a further embodiment of the invention;

FIG. 13 is perspective view of a microphone array having the geometry of FIG. 12;

FIG. 14 is a schematic plan view showing the microphone array of FIG. 13 installed in a mobile phone, and FIG. 15 is a schematic side view of the mobile phone of FIG. 14.

DESCRIPTION OF THE PREFERRED EMBODIMENTS

Figure 1:
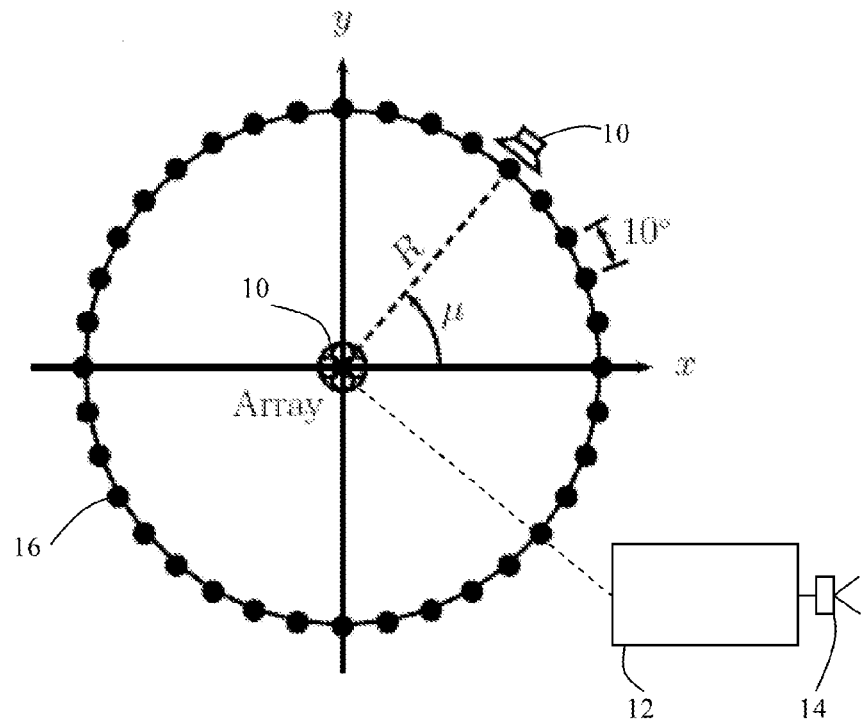
FIG. 1 is a schematic diagram of a system according to an embodiment of the invention.

Referring to FIG. 1, an audio source separation system according to a first embodiment of the invention comprises a microphone array 10, a processing system, in this case a personal computer 12, arranged to receive audio signals from the microphone array and process them, and a speaker system 14 arranged to generate sounds based on the processed audio signals. The microphone array 10 is located at the centre of a circle of 36 nominal source positions 16. Sound sources 18 can be placed at any of these positions and the system is arranged to separate the sounds from each of the source positions 16. Clearly in a practical system the sound source positions could be spaced apart in a variety of ways.

Figure 2:
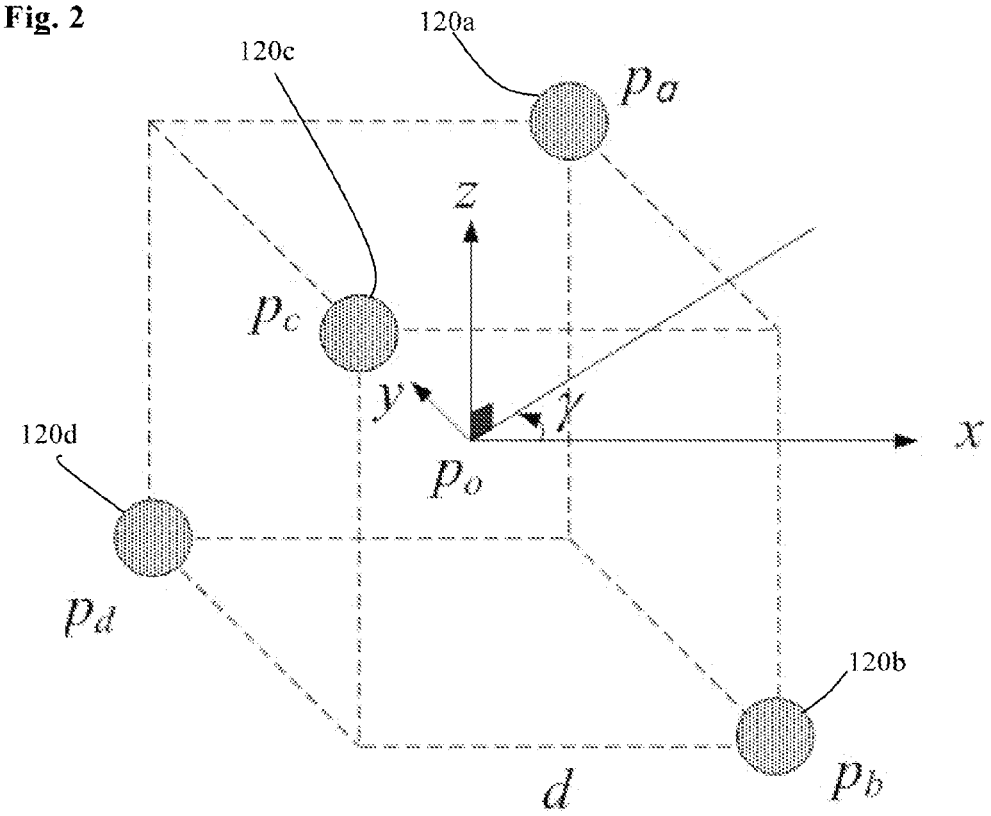
FIG. 2 is a diagram of a microphone array forming part of the system of FIG. 1.

Referring to FIG. 2, the microphone array 10 comprises four microphones 120a, 120b, 120c, 120d placed at positions which correspond to the four non-adjacent corners of a cube of side length d. This geometry forms a tetrahedral microphone array.

Let us consider a plane wave arriving from the direction $\gamma(\omega,t)$ on the horizontal plane with respect to the center of the cube. If the pressure at the centre due to this plane wave is $p_o(\omega,t)$, then the pressure signals $p_a, p_b, p_c, p_d$ recorded by the four microphones 120a, 120b, 120c, 120d can be written as, $$p_a(\omega,t) = p_o(\omega,t) e^{jkd\sqrt{2}/2 \, \cos(\pi/4 - \gamma(\omega,t))}, \quad (1)$$

$$p_b(\omega,t) = p_o(\omega,t) e^{jkd\sqrt{2}/2 \, \sin(\pi/4 - \gamma(\omega,t))}, \quad (2)$$

$$p_c(\omega,t) = p_o(\omega,t) e^{-jkd\sqrt{2}/2 \, \cos(\pi/4 - \gamma(\omega,t))}, \quad (3)$$

$$p_d(\omega,t) = p_o(\omega,t) e^{-jkd\sqrt{2}/2 \, \sin(\pi/4 - \gamma(\omega,t))}, \quad (4)$$

where k is the wave number related to the wavelength $\lambda$ as $k = 2\pi/\lambda$, j is the imaginary unit and d is the length of the one side of the cube. Using these four pressure signals, B-format signals, $p_W$, $p_X$ and $p_Y$ can be obtained as:

$$p_W = 0.5(p_a + p_b + p_c + p_d),$$

$$p_X = p_a + p_b - p_c - p_d \text{ and}$$

$$p_Y = p_a - p_b - p_c + p_d.$$

If, $kd \ll 1$, ie when the microphones are positioned close to each other in comparison to the wavelength, it can be shown by using the relations $\cos(kd \cos \gamma) \approx 1$, $\cos(kd \sin \gamma) \approx 1$, $\sin(kd \cos \gamma) \approx kd \cos \gamma$ and $\sin(kd \sin \gamma) \approx kd \sin \gamma$ that, $$p_W(\omega,t) = 2p_o(\omega,t) \quad (5)$$

$$p_X(\omega,t) = j2p_o(\omega,t)kd \cos(\gamma(\omega,t)), \quad (6)$$

$$p_Y(\omega,t) = j2p_o(\omega,t)kd \sin(\gamma(\omega,t)) \quad (7)$$

The acoustic particle velocity, v(r,w,t), instantaneous intensity, and direction of the intensity vector, $\gamma(\omega,t)$ can be obtained from $p_x$, $p_y$, and $p_w$.

Since the microphones 120a, 120b, 120c, 120d in the array are closely spaced, plane wave assumption can safely be made for incident waves and their directions can be calculated. If simultaneously active sound signals do not overlap directionally in short time-frequency windows, the directions of the intensity vectors correspond to those of the sound sources randomly shifted by major reflections.

The exhaustive separation of the sources by decomposing the sound field into plane waves using intensity vector directions will now be described. This essentially comprises taking N possible directions, and identifying from which of those possible directions the sound is coming, which indicates the likely positions of the sources.

In a short time-frequency window, the pressure signal $p_W(\omega,t)$ can be written as the sum of pressure waves arriving from all directions, independent of the number of sound sources. Then, a crude approximation of the plane wave $s(\mu,\omega,t)$ arriving from direction $\mu$ can be obtained by spatial filtering $p_W(\omega,t)$ as, $$\tilde{s}(\mu,\omega,t) = p_W(\omega,t)f(\gamma(\omega,t);\mu,\kappa), \quad (8)$$

where $f(\gamma(\omega,t); \mu,\kappa)$ is the directional filter defined by the von Mises function, which is the circular equivalent of the Gaussian function.

Spatial filtering involves, for each possible source direction or 'look direction' multiplying each frequency component by a factor which varies (as defined by the filter) with the difference between the look direction and the direction from which the frequency component is detected as coming.

For exhaustive separation, ie separation of the mixture between a total set of N possible source directions, N directional filters are used with look directions $\mu$ varied by $2\pi/N$ intervals. Then, the spatial filtering yields a row vector $\tilde{s}$ of size N for each time-frequency component:

$$\tilde{s}(\omega, t) = \begin{bmatrix} f_1(\omega, t) & 0 & \cdots & 0 \\ 0 & f_2(\omega, t) & \cdots & 0 \\ \vdots & \vdots & \ddots & 0 \\ 0 & 0 & \cdots & f_N(\omega, t) \end{bmatrix} \begin{bmatrix} p_W(\omega, t) \\ p_W(\omega, t) \\ \vdots \\ p_W(\omega, t) \end{bmatrix} \quad (9)$$

where $f_i(\omega, t) = f(\gamma(\omega, t); \mu_i, \kappa)$.

The elements of this vector can be considered as the proportion of the frequency component that is detected as coming from each of the N possible source directions.

This method implies block-based processing, such as with the overlap-add technique. The recorded signals are windowed, ie divided into time periods or windows of equal length. and converted into frequency domain after which each sample is processed as in (9). These are then converted back into time-domain, windowed with a matching window function, overlapped and added to remove block effects.

Due to the 3D symmetry of the tetrahedral microphone array of FIG. 2, the pressure gradient along the z axis, $p_z(\omega,t)$ can also be calculated and used for estimating both the horizontal and the vertical directions of the intensity vectors.

The active intensity in 3D can be written as:

$$I(\omega, t) = \frac{1}{\rho_0 c} \begin{bmatrix} Re\{p_W^*(\omega, t)p_X(\omega, t)\}u_x + \\ Re\{p_W^*(\omega, t)p_Y(\omega, t)\}u_y + \\ Re\{p_W^*(\omega, t)p_Z(\omega, t)\}u_z \end{bmatrix} \quad (10)$$

Then, the horizontal and vertical directions of the intensity vector, $\mu(\omega,t)$ and $v(\omega,t)$, respectively, can be obtained by $$\mu(\omega, t) = \arctan\left[\frac{Re\{p_W^*(\omega, t)p_Y(\omega, t)\}}{Re\{p_W^*(\omega, t)p_X(\omega, t)\}}\right], \quad (11)$$

$$v(\omega, t) = \arctan\left[\frac{Re\{p_W^*(\omega, t)p_Z(\omega, t)\}}{\left[(Re\{p_W^*(\omega, t)p_X(\omega, t)\})^2 + (Re\{p_W^*(\omega, t)p_Y(\omega, t)\})^2\right]^{1/2}}\right] \quad (12)$$

The extension of the von Mises distribution to 3D case yields a Fisher distribution which is defined as $$f(\theta, \phi; \mu, v, \kappa) = \frac{\kappa}{4\pi \sinh \kappa} \exp\left[\kappa\left\{\begin{array}{l} \cos\phi\cos v + \\ \sin\phi\sin v\cos(\theta - \mu) \end{array}\right\}\right]\sin\phi, \quad (13)$$

where $0 < \theta < 2\pi$ and $0 < \phi < \pi$ are the horizontal and vertical spherical polar coordinates and $\kappa$ is the concentration parameter. This distribution is also known as von Mises-Fisher distribution. For $\phi = \pi/2$ (on the horizontal plane), this distribution reduces to the simple von Mises distribution.

For separation of sources in 3D, the directivity function is obtained by using this function, which then enables spatial filtering considering both the horizontal and vertical intensity vector directions.

Once the spatial filtering has been performed, sound received from one or more chosen directions can be selected and, for example, reproduced through the speaker system 14.

Even though the microphones of the array are of the type which is referred to as omnidirectional, they are generally constructed in a way such that they can be considered to face in a particular direction. Typically each microphone has a sensing surface, generally being the surface of a diaphragm, which may be flat, and may be circular or square in shape, and therefore has a geometrical centre. This forms the centre point of the sensor, which is the point at which it is nominally measuring the pressure. A line from that centre point and perpendicular to the sensing surface can be considered as the central axis of the microphone and extends in the direction in which the microphone is facing. Referring to FIG. 3, in a known tetrahedral microphone array, the microphones are arranged such that each of them faces away from a common central point which is the centre of the tetrahedron. However, referring to FIG. 4, in this embodiment the four microphones 120a, 120b, 120c, 120d of the array are arranged in two pairs. In each pair, the two microphones making up the pair are arranged in the same orientation as each other, so that they both face in the same direction, as indicated by the arrows in FIG. 4, which is perpendicular to an imaginary line between their two centre points. The two pairs of microphones face in opposite directions, each pair facing generally away from the other pair. The positions of the microphones 120a, 120b, 120c, 120d in the array relative to each other is the same as in a tetrahedral array, with the centre point of each microphone being the same distance from the centre points of each of the other three.

Referring to FIG. 5, the microphone array 120 is constructed as a planar support member 130 having two opposite support surfaces 132, 134 on opposite sides. As the support member 130 is flat and regular, the two surfaces 132, 134 are parallel to each other. One pair of microphones 120a, 120c is mounted on one of the surfaces 132 and the other pair of microphones 120b, 120d is mounted on the other of the surfaces 134. Each of the microphones 120a, 120b, 120c, 120d is a MEMS microphone and comprises a body 140 with a diaphragm 142 formed on it. The body has a rear surface which is adhered directly to the support member 130 and a front surface in which the diaphragm 142 is formed. The diaphragm 142 is circular and so has a centre point 143 at its geometrical centre as described above. The diaphragm also has rotational symmetry about a central axis 144 which extends through the centre point and perpendicular to the plane of the diaphragm. The central axis extends in the direction in which the microphone faces. The first pair of microphones 120a, 120c are mounted so that they both face in the same direction which is perpendicular to the plane of the support member 130, and the second pair of microphones 120b, 120d are mounted so that they face in the opposite direction. The spacing between the diaphragm centres of the two microphones in the first pair is the same as the spacing between the diaphragm centres of the two microphones in the second pair, and is selected so that each of the microphone centre points is equidistant from the other three.

Referring to FIG. 6, in a second embodiment of the invention, the four microphones 220a, 220b, 220c, 220d are again all mounted on a common support member 230, but in this case the support member 230 is in the form of a flexible strip of sheet material. The microphones are all mounted on the same side 232 of the strip 230, but the first pair of microphones 220a, 220c is mounted on a first part 230a of the strip, and the second pair of microphones 220b, 220d is mounted on a second part 230b of the strip. The strip 230 is folded so that the two parts 230a, 230b are parallel to each other, with the side 230 on which the microphones are mounted being on the outside so that the two pairs of microphones face away from each other. The final spacing between the two parts 230a, 230b of the strip 230 is such that the diaphragm centres in the four microphones are equidistant from each other as in the previous embodiment. Referring to FIG. 6a, this can be achieved by folding the support member 230 around a rigid support block 240 having parallel opposite sides and fixing the two parts 230a, 230b of the support member 230 to the opposite sides of the support block 240.

In a modification to this embodiment, the central part of the flexible strip 230 can be removed after it has been mounted on the support block, so that in the final array, the two pairs of microphones are supported on separate support members, which are themselves mounted on opposite sides of the support block 240.

FIG. 7 shows the two pairs of microphones mounted on the support strip 230 before the strip is folded. The strip is rectangular, and one of the pairs 220a, 220c are spaced apart in a direction transverse to the strip, and the other of the pairs 220b, 220d are spaced apart in the perpendicular direction, along the strip 230. The two pairs are spaced apart by equal distances.

FIG. 8 shows a modification to the embodiment of FIG. 7, in which the support strip 330 has a wide part 330a on which the transversely spaced pair of microphones is mounted, but a narrower waisted part 330b on which the longitudinally spaced microphones are mounted. This shaping of the support strip helps to reduce boundary effects produced by the strip which can interfere with the sound being detected. FIG. 9 shows a further modification, in which the strip is made of two rectangular portions, a wider part 430a on which the transversely spaced pair of microphones is mounted, but a narrower part 430b on which the longitudinally spaced microphones are mounted.

In each of the embodiments of FIGS. 6 to 9, the microphones can be 'top ported' MEMS microphones, in which case the underside of each of the microphones is mounted on the outer surface of one of the portions of the support member, and the top surface of the microphone is arranged to detect sound waves. Alternatively, the microphones can be 'bottom ported' MEMS microphones in which case each of the microphones is mounted on the inner surface of one of the portions of the support member, and the support strip has an aperture through it for each of the microphones, through which sound waves can reach the underside of the microphone, which is arranged to detect them.

Figure 10:
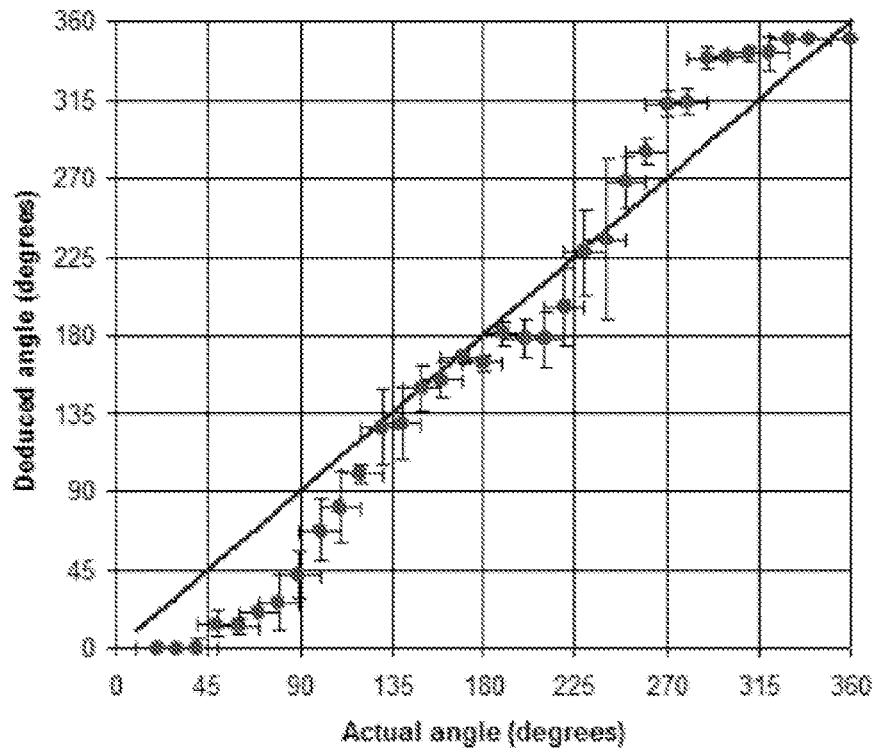
FIGS. 10 and 11 show results of experiments performed using an embodiment of the invention.
Figure 11:
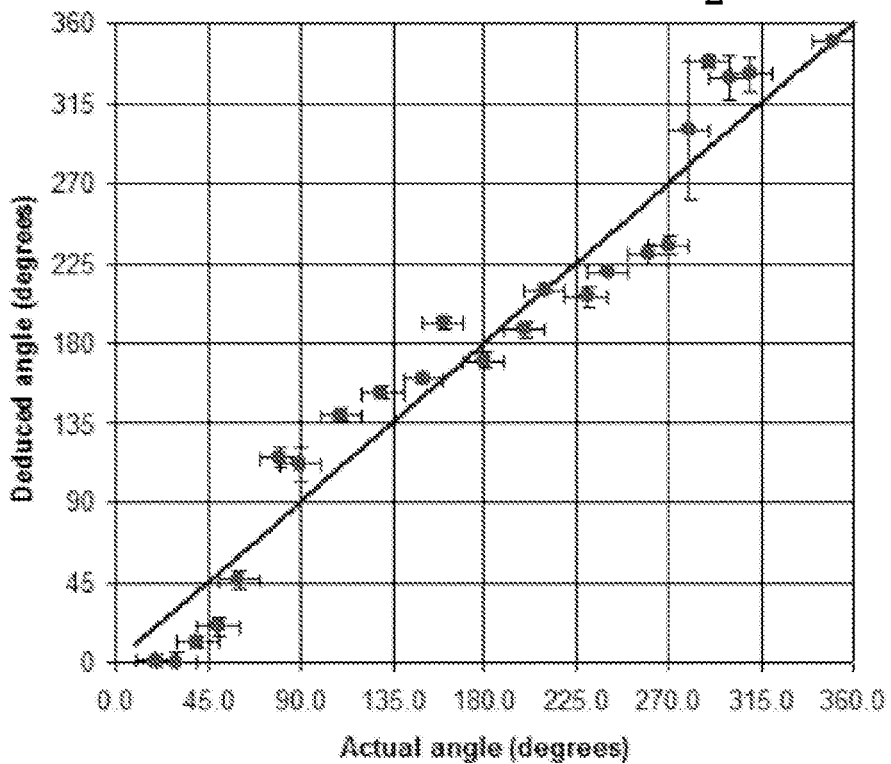

To test the effectiveness of the invention a microphone array was constructed using four omnidirectional capsule microphones (Rapidonline product code 35-0192) mounted two on each side of a rigid PCB. The microphones were cylindrical and had a diameter of 9.8 mm and a diaphragm located inside the capsule 6 mm above the bottom side of the capsule, the centre of the diaphragm forming the centre point of the microphone. The PCB thickness was 1.6 mm, so the separation between the plane of the microphone diaphragms on one side of the PCB and the plane of those on the other was 13.6 mm. The two microphones on each side were therefore mounted facing in the same direction with their centres 13.6–$\sqrt{2}$ (19.2) mm apart in an arrangement similar to that of FIG. 5, resulting in a tetrahedral spacing of the centre points. The method described above was used to measure the positions of various sound sources relative to the microphone array, and the correspondence between measured positions and the actual positions are shown in FIGS. 10 and 11. As can be seen, there is good correspondence between the measured and actual positions, though some inaccuracy arises, which is assumed to be due to lack of calibration of the microphones.

Referring to FIG. 12, a microphone array forming part of a system of a further embodiment of the invention comprises four microphones 520a, 520b, 520c, 520d, again spaced so that the centre point of each of them is equidistant from the centre points of the three others. However, in this case a group of three of the microphones 520a, 520b, 520c all face in the same direction, and the one remaining microphone 520d faces in the opposite direction. The group of three microphones 520a, 520b, 520c, lie in a common plane, and the direction in which they face is perpendicular to that plane, and generally away from the other, fourth, microphone 520*d*. The fourth microphone 520*d* faces away from the common plane of the other three 520*a*, 520*b*, 520*c*.

Referring to FIG. 13, the array of FIG. 12 is constructed using a flexible strip support member 530 similar to that of FIG. 6. However in this case the group of three microphones 520*a*, 520*b*, 520*c* are arranged in a triangular array, each equidistant from the other two, near one end of the strip, and the fourth microphone 520*d* is located near the other end of the strip. Each of the microphones faces in a direction perpendicular to the surface of the strip 520 on which it is mounted. The strip is folded through 180 degrees so that the fourth microphone 520*d* faces in the opposite direction to the other three, and so that the sensing centre point of the fourth microphone is located equidistant from the centre points of the other three.

Referring to FIGS. 14 and 15 a device 600 in which the array is mounted, which in this case is a mobile phone but could be another device such as a laptop, television, netbook etc, is generally rectilinear having a front face 602 and a rear face 604 which are parallel to each other. The front and rear faces 602, 604 are both generally rectangular but have rounded corners 606. The front face 602 has a screen on it which takes up most of its surface area, and is larger than the rear face 604. The side surface 606 of the phone, which extends between the front and rear faces 602, 604, is curved. The phone 600 includes a microphone array comprising four microphones 620*a*, 620*b*, 620*c*, 620*d* arranged on a substrate in the same manner as that of FIG. 13. The array is orientated so that the three microphones 620*a*, 620*b*, 620*c* that are on one side of the substrate and facing in the same direction are located under the front face 602 of the phone facing forwards, and the fourth microphone which faces in the opposite direction is located under the rear surface of the phone facing backwards out of the rear face. The three microphones 620*a*, 620*b*, 620*c*, as they are equidistant from each other, are at the corners of an equilateral triangle. Two of those microphones 620*a*, 620*b* are located close to the outer edge of the top surface 602. In this embodiment they are in the curved corner region 606, and are arranged so that the line joining them is at 45° to each of the sides that join at the corner. The third of the three microphones 620*c* is located equidistant from the two sides that join at the corner, on the plane of symmetry of the corner (which is perpendicular to the front and rear surfaces and at 45° to each of the sides that join at the corner). Similar non-symmetrical arrangements can also be used.

In other embodiments, the shape of the casing of the device will be different, and therefore the exact arrangement of the microphones may be optimized for the particular device.

In other embodiments, the array of FIGS. 14 and 15 is arranged the other way up, so that the three microphones 620*a*, 620*b*, 620*c* are closer to the rear face and face backwards, and the fourth microphone 620*d* is near the front face and faces forwards. This has the advantage that the casing of the device, which will generally have a hole in for each of the microphones, to allow sound from outside the device to reach the microphones, will only have one hole in the front face rather than three. Where the front face of the device has a flat screen with a bezel around the edge, the one microphone under the front face can be arranged behind the line at which the bezel meets the edge of the screen. This means that, in some cases, the hole for the front microphone can be formed at the edge of the bezel. For example the edge of the hole may be formed partly by the screen and partly by the bezel. In still further embodiments, the orientation of the array can be modified in other ways to suit the individual geometry of the device to which it is fitted.

The systems described above are arranged for source separation, ie to identify the components of a sound mixture coming from each of a plurality of sources in different locations. However it will be appreciated that in other embodiments the systems can be arranged to identify components of sound from just a single direction. This can be useful in directional listening devices.

The invention claimed is:

1. A system for directionally selective sound reception comprising an array of pressure sensors each arranged to output a pressure signal indicative of pressure, and processor arranged to receive the pressure signals, generate from the pressure signals a series of sample values of measured directional pressure gradient, identify a plurality of frequency components of the pressure signals, identify at least one source direction, and identify at least one of the components as coming from the source direction, wherein the sensor array comprises a support having two opposite sides and comprising a sheet; and four sensors, at least one of the sensors being supported on each of the sides of the support, and the pressure sensors each having a central axis, the central axes being parallel to each other.

2. A system according to claim 1 wherein there is a pair of the sensors supported on each of the sides, each pair comprising two sensors facing in the same direction.

3. A system according to claim 1 wherein three of the sensors are supported on one of the sides and one of the sensors is supported on the other of the sides.

4. A system according to claim 1 wherein the support has two surfaces, which are parallel to each other, each of said surfaces having one of said pairs of sensors mounted on it.

5. A system according to claim 1 wherein the sheet is flat with the two surfaces being on opposite sides of the sheet.

6. A system according to claim 1 wherein the support comprises two sheet portions which are parallel to each other, each of the sheet portions having an outer surface which faces away from the other of the sheet portions, and an inner surface which faces towards the other of the sheet portions, the outer or inner surfaces, or at least one of each, forming the surfaces on which the sensors are mounted.

7. A system according to claim 6 wherein the sheet portions are connected to each other forming part of a single sheet member.

8. A system according to claim 1 wherein each of the sensors has a sensing centre point, and the sensing centre points of the four sensors are arranged such that each of them is equidistant from each of the other three.

9. A system according to claim 8 wherein each sensor comprises a diaphragm.

10. A system according to claim 9 wherein the sensing centre point is the geometrical centre of the diaphragm.

11. A system according to claim 9 wherein the diaphragms of all four sensors are parallel to each other.

12. A device having a front face and a rear face and including a system according to claim 1, wherein each of the sides of the support is arranged parallel to one of the faces.

13. A device according to claim 12 wherein one of the front face and the rear face is formed of two components defining a boundary therebetween, and a hole is formed at the boundary between the two components to allow sound from outside the device to reach one of the microphones.

14. A system for directionally selective sound reception comprising an array of pressure sensors each arranged to output a pressure signal indicative of pressure, and a processor arranged to receive the pressure signals, generate from the pressure signals a series of sample values of measured directional pressure gradient, identify a plurality of frequency components of the pressure signals, identify at least one source direction, and identify at least one of the components as coming from the source direction, wherein the sensor array comprises: a rigid support block having two opposite sides; and four sensors, at least one of the sensors being supported on each of the sides of the support block, and the pressure sensors each having a central axis, the central axes being parallel to each other.

15. A system according to claim 14 wherein there is a pair of the sensors supported on each of the sides, each pair comprising two sensors facing in the same direction.

16. A system according to claim 14 wherein three of the sensors are supported on one of the sides and one of the sensors is supported on the other of the sides.

17. A system according to claim 14 wherein the support block has two surfaces, which are parallel to each other, each of said surfaces having one of said pairs of sensors mounted on it.

18. A system according to claim 14 wherein each of the sensors has a sensing centre point, and the sensing centre points of the four sensors are arranged such that each of them is equidistant from each of the other three.

19. A system according to claim 14 wherein each sensor comprises a diaphragm.

20. A system according to claim 19 wherein the sensing centre point is the geometrical centre of the diaphragm.

\* \* \* \* \*